(12) United States Patent
Beatty

(10) Patent No.: US 10,241,870 B1
(45) Date of Patent: Mar. 26, 2019

(54) DISCOVERY OPERATIONS USING BACKUP DATA

(71) Applicant: Veritas Technologies LLC, Mountain View, CA (US)

(72) Inventor: Louis Beatty, Ormond Beach, FL (US)

(73) Assignee: Veritas Technologies LLC, Santa Clara, CA (US)

( * ) Notice: Subject to any disclaimer, the term of this patent is extended or adjusted under 35 U.S.C. 154(b) by 100 days.

(21) Appl. No.: 13/773,962

(22) Filed: Feb. 22, 2013

(51) Int. Cl.
*G06F 11/14* (2006.01)
(52) U.S. Cl.
CPC ................ *G06F 11/1451* (2013.01)
(58) Field of Classification Search
CPC .......... G06F 11/1451; G06F 11/1458
USPC ........................................................ 707/640
See application file for complete search history.

(56) References Cited

U.S. PATENT DOCUMENTS

| | | | | |
|---|---|---|---|---|
| 7,937,369 | B1* | 5/2011 | Dings et al. ................ | 707/652 |
| 8,139,924 | B2* | 3/2012 | Walters et al. ............ | 386/328 |
| 8,700,567 | B2* | 4/2014 | Watanabe et al. .......... | 707/610 |
| 8,805,787 | B2* | 8/2014 | Hao et al. .................... | 707/640 |
| 2007/0185926 | A1* | 8/2007 | Prahlad ............ | G06F 17/30997 |
| 2008/0229037 | A1* | 9/2008 | Bunte ................ | G06F 11/1451 |
| | | | | 711/162 |
| 2010/0114829 | A1* | 5/2010 | Prahlad ............ | G06F 17/30528 |
| | | | | 707/640 |
| 2010/0241947 | A1* | 9/2010 | Dahn ................ | G06F 17/30637 |
| | | | | 715/233 |
| 2010/0299309 | A1* | 11/2010 | Maki .................. | G06F 11/1479 |
| | | | | 707/640 |
| 2012/0179656 | A1* | 7/2012 | Bunte et al. ................. | 707/667 |
| 2012/0254115 | A1* | 10/2012 | Varadharajan .... | G06F 17/30221 |
| | | | | 707/640 |

OTHER PUBLICATIONS

"What's New in eDiscovery in SharePoint Server 2013," published on Jul. 16, 2012, Microsoft Corporation.
"SharePoint Server 2013 IT Professional Reviewer's Guide," 2012, Microsoft Corporation.

* cited by examiner

*Primary Examiner* — Hicham Skhoun
(74) *Attorney, Agent, or Firm* — Campbell Stephenson LLP

(57) ABSTRACT

Various systems and methods for using backup data in a discovery operation. For example, one method can involve accessing information in a backup that identifies data objects associated with a discovery operation. The information and the data objects are both located in the backup. The backup includes a backup of a content management system that was used to perform the discovery operation. The method also involves restoring the information and the data objects from the backup to one or more target locations.

19 Claims, 11 Drawing Sheets

DISCOVERY OPERATIONS USING BACKUP DATA

FIELD OF THE INVENTION

This invention relates to content management systems and backup systems. More particularly, this invention relates to interaction between content management systems and backup systems to perform various tasks, such as discovery operations.

DESCRIPTION OF THE RELATED ART

Computers and computer data are becoming more and more important. Consequently, if one requests information from an enterprise or individual, it is likely that a response to the request will include computer data. More specifically, such requests may specify general restrictions and/or requirements, such as a requirement that the requested data reflect the data state at a specific point in time (or during a given time period, or the like.) For example, an enterprise may receive a discovery request that compels production of all records related to litigation in which the enterprise is involved, the records will likely include computer data. However, collecting computer data presents challenges not involved in collecting data stored in other types of media, e.g., paper records. For example, computer data can often be accessed by multiple entities concurrently. Also, multiple versions of a given piece of computer data can exist in multiple locations, and ensuring that the proper version is discovered may not be a simple matter. Furthermore, access to the computer data is often dependent on the proper functioning of computer infrastructure, such as storage systems, related software, network connections, and the like. Given that the aggregation of this information will typically reflect the state of the information at the time the discovery is performed, determining the results of such inquiries and ensuring their accuracy present challenges not easily met.

Moreover, a typical system used to organize and access computer data, such as a content management system, tends to complicate such inquiries. A content management system typically includes a content management application, which is a computer program that provides a central interface to access and modify computer data, referred to as content. The content can be stored in multiple locations, referred to as content sources, and can include multiple types of data accessible via multiple other applications.

In response to a discovery request, a user can identify content responsive to the discovery request using a content management application. The content management application can identify content across multiple different content sources. Simply identifying the content is not enough to satisfy a discovery request. Satisfying the discovery request is also likely to involve ensuring that the data is not modified, deleted, or otherwise made unavailable after or during satisfaction of the discovery request. However, doing so can be difficult given that content can be distributed among various locations and accessible to various parties. For example, one or more content sources, or the content management application itself, can become unavailable, e.g., due to a hardware or software failure. This unavailability can impair a user's ability to be completely responsive to a discovery request.

To ensure ongoing availability of such information, even in the face of failures such as those noted above, backup applications are used to ensure that data is preserved and available. Backup applications generally perform backup operations that create backup sets that include backup copies of content. It is desirable to use content from a backup to fulfill a discovery request that cannot be completed using a content management system, e.g., due to content becoming unavailable to the content management system. However, backup applications commonly utilize proprietary formats and procedures. Consequently, it is often impossible for applications other than the backup application that creates a backup copy to access data stored in the backup copy. For example, if a backup application creates a backup copy of content managed by a content management application, the content management application is typically unable to locate and access specific data objects in the backup copy. In order to access the content from the backup set, the content is first restored by the backup application to the content management application. Further, such machinations typically require the user to contact a system administrator, submit a request for the system administrator to perform the restoration, and then wait for the system administrator to alert the user of the restored data's availability.

Given that discovery of digital content (computer data) is becoming an important function to many organizations and individuals, and given that computer data can become unavailable to primary data systems, such as content management systems, it is desirable to provide a mechanism to discover content from a backup of the content management system. For example, the systems that originally stored the content may have been backed up during or after a point at which a user of the systems performed a period-of-time or point-in-time inquiry (e.g., a legal discovery operation).

BRIEF DESCRIPTION OF THE DRAWINGS

The present invention may be better understood, and its numerous objects, features and advantages made apparent to those skilled in the art by referencing the accompanying drawings.

Figure 1:
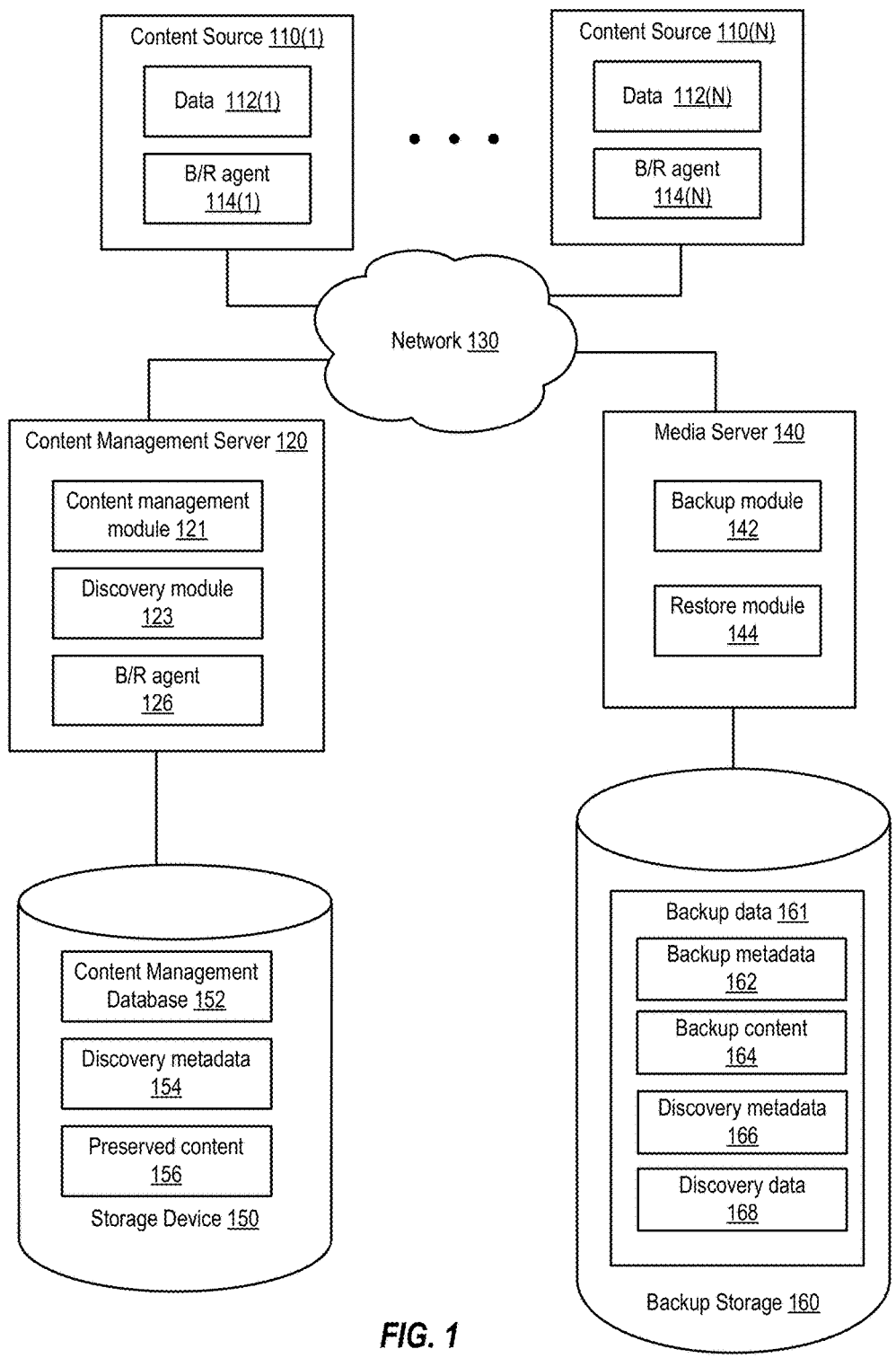
FIG. 1 is a block diagram of a system configured to complete a discovery operation using a backup data set, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Computer data in a variety of formats can be organized and accessed using a content management system. Typical content management systems include a content management application configured to organize and manage content, e.g., using constructs such as data objects. Such content can be stored in a single storage system or across multiple locations, such as across several different computer systems, referred to as content sources. A discovery operation can be performed that seeks to identify data objects managed by the content management application. Data objects that meet one or more discovery criteria are targeted by the discovery request. For example, a discovery request can specify that all emails sent from User 1 to User 2 should be discovered. In response to the discovery request, the content management application collects information that identifies the data objects that are subject to the discovery request. Data objects that are discovered as part of a discovery operation are preserved in the form they existed in at the time the discovery request was received.

It is not uncommon for one or more data objects to become unavailable to a content management application that is configured to provide access to the data objects. Data objects can become unavailable for a number of reasons. For example a data object can become unavailable due to being deleted, moved, or modified by a user. Furthermore, failures such as hardware failures, software failures, and/or network outages can cause a data object to become unavailable to a content management application. Discovery operations performed using the content management application can be affected by a data object becoming unavailable. For example, a discovery operation can be impeded by failures occurring subsequent to the successful completion of such inquiries, or failures that prevent such inquiries from being successfully completed (e.g., by issues with availability of data objects).

Assuming that the data objects have been backed up, it should still be possible to complete the discovery operation. However, with typical systems, doing so involves first restoring the data objects from backup storage to the content sources managed by the content management application. Unfortunately, restoring content from a backup can be a time-consuming process, often resulting in significant inefficiencies. For example, if a user of a content management application wishes to restore a single data object, e.g., a file, doing so may require restoration of an entire backup data set, due to the inability of the content management application to access items directly from the backup data set. Restoring more data than is actually desired represents an inefficient use of the resources involved in restoring the extra data, such as transmission bandwidth and processor cycles.

While it is possible, in certain instances, to access individual data objects from a backup data set, doing so can involve intervention from a third party program to index the backup set's data structure. An alternative to restoring an entire backup data set, or using a third party program other than the backup application and content management application, is for the backup application to create the backup data set using a granular backup process. Granular backup processes typically result in backup sets from which data can be restored piecemeal. However, creating granular backups is generally more time consuming than creating other types of backups. Thus, each of these options utilizes additional resources. This increases the cost, in terms of computing resources, of accessing selected data objects from a backup data set. Even if a granular backup of a content management system were performed, it would still be impossible, using current backup applications, to identify the appropriate data to complete a discovery request performed by the content management system. Current backup applications are unaware of formats and techniques used to ensure that the proper version of any given data is maintained and produced in response to a discovery request.

After the data is restored the content management application can repeat the discovery operation. This multi-step process of first restoring then recreating the discovery can involve transmission of unnecessarily large amounts of data, as well as duplication of operations. What is needed is a way to extract data objects related to the discovery operation from the backup in order to complete the discovery operation. The system shown in FIG. 1 is configured to avoid these issues while preventing data object unavailability from interfering with successful completion of discovery operations.

FIG. 1 shows a system configured to use backup data to complete discovery operations. As shown, FIG. 1 includes several content sources 110(1)-110(N), collectively referred to as content sources 110. Network 130 couples content sources 110 to a content management server 120, which is coupled to a storage device 150, and a media server 140, which is coupled to a storage device 160. Network 130 can include a WAN (Wide Area Network), such as the Internet, one or more LANs (Local Area Networks), and/or one or more SANs (Storage Area Networks).

It will be noted that the variable identifier "N" is used to more simply designate the final element of a series of related or similar elements (e.g., content sources). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

Content sources 110 are implemented as computing devices such as personal computers, laptop computers, servers, personal digital assistants, cell phones, and the like. Content sources 110 can be one or more mail servers, web servers, file servers, document repositories, database servers, and the like. Content sources 110 can include one or more applications, not shown, such as word processing programs, email programs, graphic editing programs, database applications, or the like. As shown in FIG. 1, content sources 110 are discrete computing devices. In one embodiment, content sources 110 can be implemented as components or modules included in other computing devices, such as content management server 120.

Content sources 110 are configured to store data, as shown by data 112(1) through data 112(N), collectively referred as data 112. Data 112 can be organized logically into one or more data objects, such as files, folders, directories, file systems, and the like, or any portion or division of the same. The data objects can also be organized physically into one or more blocks, segments, extents, and the like, or any portion of the same.

Content sources 110 also include backup and restore (B/R) agents 114(1)-114(N), collectively referred to as B/R agents 114. B/R agents 114 are configured to perform backup and restore operations. In one embodiment, performing backup and restore operations involves B/R agents 114 interacting with media server 140. A backup operation can involve creating a backup copy of all or a portion of data 112 and storing the backup copy in backup storage, such as in data 152 in storage device 150. A restore operation can involve restoring some or all of the backed-up data from backup storage to data 112.

Content sources 110 are coupled to a content management server 120. Content management server 120 is a computing device such as a personal computer, laptop computer, server, personal digital assistant, cell phone, or the like. Data 112 can be viewed and/or accessed by one or more users of content management server 120. Content management server 120 enables users to share data 112.

As shown in FIG. 1, content management server 120 includes a content management module 121. In one embodiment, content management module 121 is implemented as a content management application, such as Microsoft® Sharepoint®. Content management module 121 is configured to provide access to content in a plurality of locations, such as data 112 in content sources 110. Content management module 121 is also configured to index data 112 and to facilitate shared access to data 112.

Content management module 121 is also configured to create and maintain a content management database 152. Content management database 152 includes information about content (data, in its various forms and formats) that is managed by content management module 121. For example, content management database 152 can include metadata that describes characteristics of data 112, such as location information, file type, ownership, access permission(s), date of creation/modification, index information, and the like. In one embodiment, content management database 152 is implemented as a master database file (MDF). In certain embodiments, content management database 152 also includes certain portions of the content being managed.

Also shown in content management server 120 is a discovery module 123. While content management module 121, discovery module 123, and B/R modules are shown in FIG. 1 as discrete components, it is understood that these elements can be included in a single module, such as content management module 121. Discovery module 123 is configured to perform discovery operations on content managed by content management module 121, including content stored in one or more of content sources 110 and/or in content management database 152. In one embodiment, discovery module 123 initiates a discovery operation in response to receiving a request from a user to identify and/or preserve content stored in content management database 152 and/or one or more of content sources 110. Performing the discovery request involves discovery module 123 generating information that identifies content (e.g., organized as data objects) associated with the discovery operation. Discovery module 123 stores the information in discovery metadata 154. In one embodiment, discovery metadata 154 includes a list of data objects associated with at least one discovery operation, as well as information identifying when the data objects were last accessed (e.g., read, written, and/or modified).

Discovery module 123 is also configured to cause the data objects to be preserved in the state they exist at the time the discovery request is received. In one embodiment, this involves discovery module 123 identifying one or more data objects that satisfy one ore more discovery criteria, creating a copy of data from one or more of the data objects, and storing the copy of the data in storage reserved for such data (e.g., depicted in FIG. 1 as preserved content 156). Performing a discovery operation is discussed in additional detail in connection with FIG. 3 and its related description.

Content management server 120 also includes a backup and restore (B/R) agent 126. B/R agent 126 is configured to perform backup and restore operations. Performing backup and restore operations can involve B/R agent 126 interacting with media server 140. In one embodiment, performing a backup operation involves creating a copy of some or all of the data stored in content sources 110, content management database 152, discovery metadata 154, and or preserved content 156, and storing the copy in backup storage, such as backup storage 160. Performing a restore operation involves identifying some or all of the backed up data and restoring the data from backup storage to content management database 152 and/or content sources 110.

The system depicted in FIG. 1 also includes a media server 140. Media server 140 includes a backup module 142 and a restore module 144. Backup module 142 is configured to generate backups of content, such as content stored in one or more of content sources 110 and/or content stored in storage device 150. Backup module 142 is configured to automatically create a backup in response to detecting the occurrence of an event, such as expiration of a specified time period. In one embodiment, backup module 142 creates a backup in response to user input indicating that a backup should be created. In one embodiment, performing a backup operation involves backup module 142 creating a backup image that includes all data managed by content management server 120 and storing the backup image in backup data 161. Backup data 161 can be implemented as one or more backup images created in respective backup operations. Such backup images can include monolithic backups of all content managed by content management server 120, or backups of a portion of such data, e.g., incremental backup images. Backup module 142 is configured to include all content in a single backup image file, or to backup the content to multiple backup files. For example, backup module 142 is configured to backup discovery metadata 154 to discovery metadata 166 and to backup preserved content 156 to discovery data 168. While discovery metadata 166 and discovery data 168 are shown as being included in backup data 161, discovery metadata 166 and discovery data 168 need not be so, and can be backed up and stored separately from any other data included in backup data 161. Similarly, backup module 142 is configured to backup and store backup metadata 162 separately.

Backup module 142 can be configured to detect whether any discovery operations have been initiated. If so, backup module 142 backs up discovery metadata 154 to discovery data 168 and preserved content 156 to discovery data 168. As discovery metadata 154 includes information identifying which data objects are involved in one or more discovery operations, and preserved content 156 may also include one or more of the data objects as they existed at the time of the discovery operations, backing up discovery metadata 154 and preserved content 156 to backup data 161 enables the recreation of the discovery operation. For example, if a discovery operation is performed by discovery module 123, but the discovered data objects cannot be produced due to one or more of the data objects becoming unavailable, discovery module 123 can complete the discovery operation using backup data 161. Creating a backup is discussed in additional detail in connection with FIG. 5 and related description.

Media server 140 also includes restore module 144. Restore module 144 is configured to access data, such as backup data 161, and restore data objects, such as one or more data objects associated with a given discovery operation. In one embodiment, restoring the data objects includes restoring the data objects from backup data 161 to a location which the data was originally backed up from. Media server 140 is configured to locate and identify specific data objects in backup data 161 without restoring an entire backup set. Restore module 144 is configured to access backup metadata 162 to identify the location in backup data 161 of discovery metadata 166. Restore module 144 is configured to use discovery metadata 166 to identify data objects associated with a discovery operation, and backup metadata 162 to locate the data objects in backup data 161, specifically within backup content 164 and/or discovery data 168.

After a discovery operation is initiated, some of the content included in the discovery operation can become unavailable, e.g., due to hardware or software failure. In response to detecting that the content is unavailable, the user can restore the content from a backup copy of the content stored in backup data 161. Restoring data from backup is discussed in additional detail in connection with FIG. 7 and related description.

As shown in FIG. 1, storage device 150 is coupled to content management server 120 and backup storage 160 is coupled to media server 140. Storage devices 150 and 160 provide persistent data storage, such that data stored on such storage devices will remain stored even after the storage device is powered off. Such storage devices can be, for example, one or more hard disks, compact discs (CD), digital versatile discs (DVD), or other mass storage devices, or a storage system (e.g., a redundant array of independent disks (RAID) system or an optical storage jukebox) that includes an array of such storage devices. Such storage devices can also be virtual or logical storage devices that are implemented on such physical storage devices and/or storage systems. For example, such storage devices can be one or more logical volumes that are implemented on a RAID storage system. Additionally, such storage devices can include one or more storage devices. Such storage devices can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Figure 2:
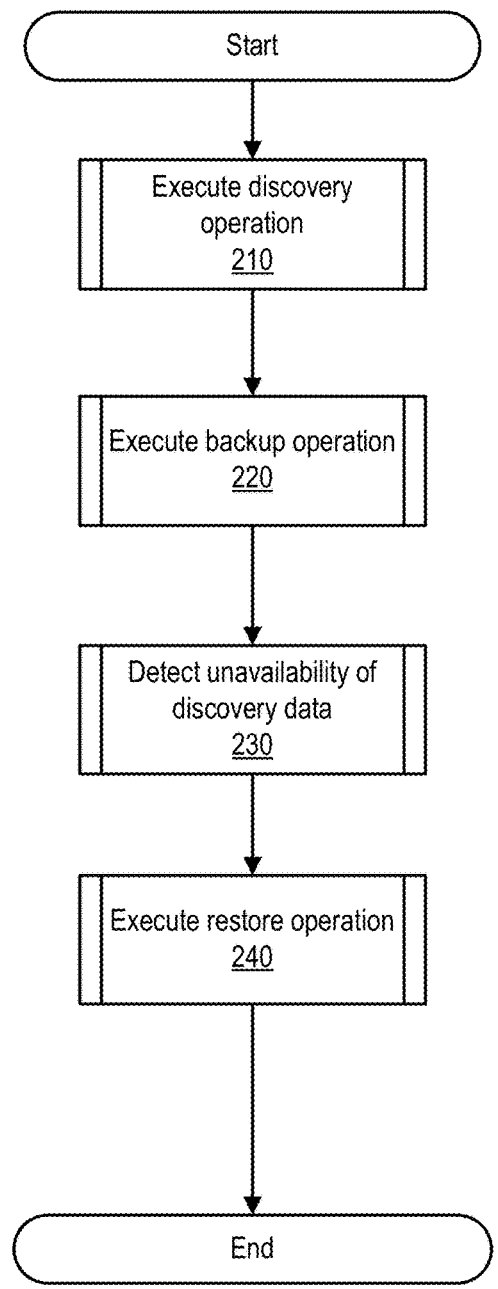
FIG. 2 is a flowchart of a method of performing a discovery operation using a backup data set, according to one embodiment.

FIG. 2 is a flowchart of a method of completing a discovery operation utilizing data stored in a backup data set, such as backup data 161 of FIG. 1. The method begins at 210, with the execution of a discovery operation. The discovery operation can be executed, for example, by a discovery module, such as discovery module 123 of FIG. 1. In one embodiment, executing a discovery operation involves identifying one or more data objects that are managed by a content management system and preserving the data objects in the form in which the data objects existed at the time the discovery operation is requested, such that the data objects can be produced at a later date in that form. The discovery operation is discussed in greater detail in connection with FIG. 3 and its related description.

After initiation (or completion) of the discovery operation, the method proceeds to 220, at which point a backup operation is executed. The backup operation can be performed, for example, by a backup module, such as backup module 142 of FIG. 1. Executing the backup operation involves, for example, copying content managed by a content management module, such as content management module 121 of FIG. 1, from one or more content sources, such as content sources 110 of FIG. 1, to backup storage, such as backup storage 160 of FIG. 1. In one embodiment, the backup operation additionally involves storing information that identifies data objects associated with one or more discovery operation, as well as the data objects as they existed at the time the discovery operation was requested. The backup operation is described in more detail in connection with FIG. 5 and its related description.

At 230, discovery data is detected as being unavailable, e.g., by a content management module, such as content management module 121 of FIG. 1. In one embodiment, 230 involves an attempt to respond to a query for discovered data objects. This is described in greater detail in connection with FIG. 6 and its related description.

Figure 3A:
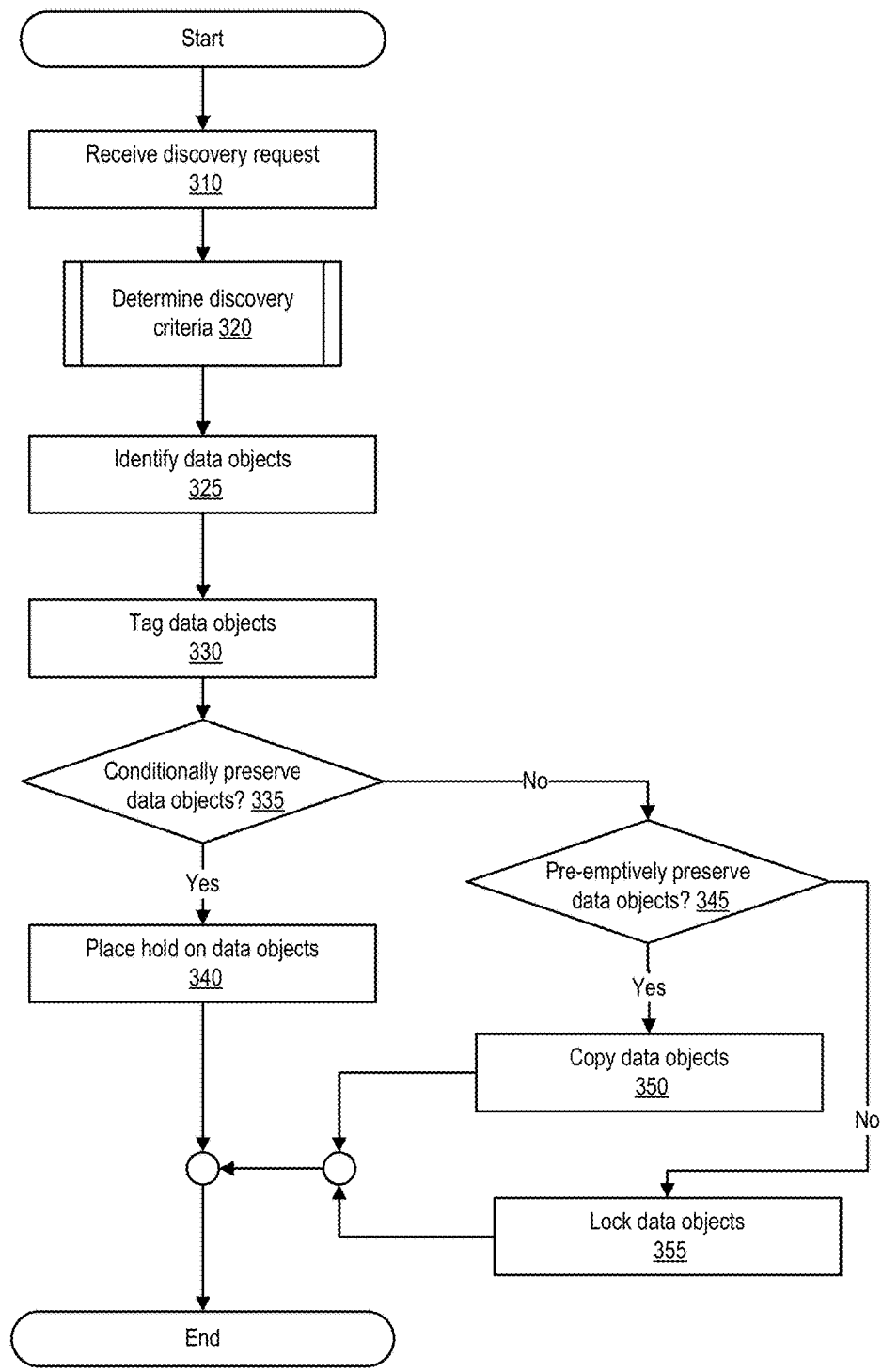
FIG. 3A is a flowchart showing additional details of a method of performing a discovery operation, according to one embodiment.

A restore operation is executed at 240. The restore operation can be performed, for example, by a restore module, such as restore module 144 of FIG. 1. In one embodiment, the restore operation involves restoring a set of data objects associated with a discovery operation in the form that the data objects existed at the time the discovery operation was requested, as well as information that identifies the set of data objects. The restore module can also locate and restore metadata indicating which data objects meet one or more discovery criteria. The restore operation is described in more detail in connection with FIG. 7 and its related description FIG. 3A is a flowchart showing additional details of performing a discovery operation. The discovery operation can be performed, for example, by a discovery module, such as discovery module 123 of FIG. 1. The discovery module is configured to receive a set of criteria related to a discovery operation and to interact with a content management module, such as content management module 121 of FIG. 1, to identify one or more data objects that satisfy the discovery criteria. The discovery module is also configured to preserve the data objects in the form in which the data objects exist at the time the discovery operation is initiated.

At 310, the discovery module receives a discovery request. The discovery request can be received from a user, e.g., in association with a lawsuit. Alternatively, the discovery request can be automatically generated, e.g., as part of a periodic audit, or in response to detecting an event, such as a potential security breach. In one embodiment, the discovery request includes one or more discovery criteria. The discovery criteria are detected by the discovery module at 320, as discussed in greater in connection with FIG. 4 and its related description.

The discovery module is configured to identify, at 325, data objects or other content items that satisfy the discovery criteria and preserve those data objects. The data objects thus identified will be included in the discovery operation. In one embodiment, the discovery module updates discovery metadata, such as discovery metadata 154 of FIG. 1, with information identifying the data objects, such as file names, descriptors, and/or location information. The discovery module can also preserve data objects thus identified by creating a copy of all such objects, e.g., in preserved content 156 of FIG. 1. The discovery module searches for data objects stored on one or more of the content sources specified by the discovery request. If no content sources are specified in the discovery request, the discovery module searches all available content managed by the content management module. In one embodiment, the discovery module examines one or more indexes of content managed by the content management module. The index includes such information as the name, location, owner, and content-related information, such as keywords and/or phrases, for the data objects. In one embodiment, the discovery module does not rely on index information, but instead directly searches one or more content sources. Alternatively, a combination of these approaches can be employed.

At 330, the discovery module tags the data objects identified at 325. In one embodiment, tagging a data object involves generating a list of data objects and/or adding information regarding the data object to a list of data objects that satisfy one or more of the discovery criteria associated with the discovery operation. For example, the discovery module can create a list of data objects and include metadata regarding the data objects, such as information identifying where (which content source) the data object is stored, when the data object was created and/or modified, by whom, the reason that the data object was included in the discovery object (e.g., which discovery criteria is met by the data object), and the like. The discovery module stores the list of data objects and metadata in discovery data, such as discovery metadata 154 of FIG. 1. In one embodiment, the discovery module creates a separate listing for each discovery operation. Thus, to locate all data objects associated with a given discovery operation, one can access the listing associated with the discovery operation.

In one embodiment, tagging the data object involves modifying the data object's metadata. The discovery module can update or add information to metadata associated with the data object indicating that the data object is associated with a discovery operation. Updating the data object's metadata can trigger notification to the discovery module of subsequent attempts to access, e.g., read, modify, or delete, the data object.

At 335, the discovery module determines (e.g., based on user input and/or configuration information) whether to conditionally preserve the data objects. If so, the discovery module places a hold on the identified data objects at 340. Placing a hold on a data object ensures that the data object is preserved in the form in which the data object existed at the time of the discovery request. The discovery module can detect any attempt to modify or delete a data object that is placed on hold, and can create a copy of the data object, or a portion of the data object, that is affected. The discovery module stores the copied data in a storage area allocated for that purpose, such as preserved content 156 of FIG. 1. The discovery module can then allow the original copy of the data object to be modified. If the discovery module is not configured to conditionally preserve data objects, the discovery module determines, at 345, whether to preemptively preserve the data objects. Preemptively preserving the data objects involves, in one embodiment, the discovery module creating a copy of the data object in response to detecting that the data object is subject to a discovery operation, at 350. However, since not all data objects discovered are likely to be modified, this option can result in additional data objects being copied. If no preservation measures are initiated at 335 or 345, the discovery module locks the identified data objects at 355. Locking a data object prevents any modification of the data object, such as a modify or delete operation, and can optionally prevent the data object from being read.

Figure 3B:
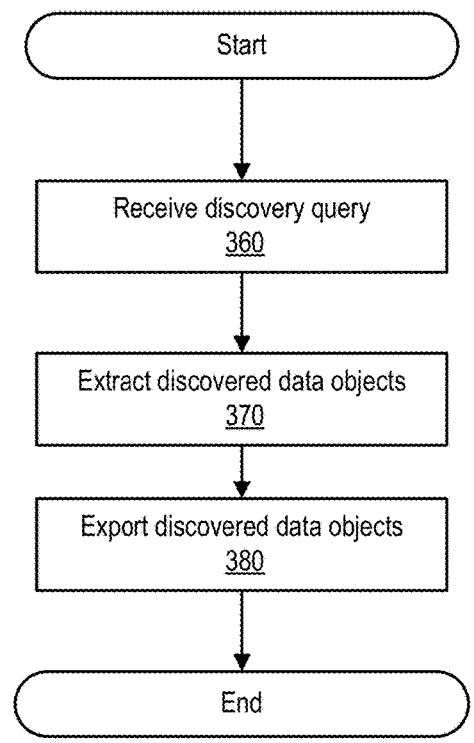
FIG. 3B is a flowchart showing additional details of a method of producing discovered data objects, according to one embodiment.

FIG. 3B is a flowchart showing additional details of performing a discovery operation. Specifically, FIG. 3B relates to producing the discovered data objects. The operations of FIG. 3B can be performed, for example, by a discovery module, such as discovery module 123 of FIG. 1. In one embodiment, performing a discovery operation also involves receiving a discovery query, at 360. After the discovery module has identified and ensured preservation of one or more data objects associated with the discovery request, a user can query the discovery module to gain access to the results of the discovery operation. A query includes information that identifies a particular discovery request, and can specify that all or part of the results of the discovery operation should be returned. At 370, the discovery module extracts the discovered data objects. In one embodiment, this involves copying a portion (or all) of the data objects from preserved content and a portion (or all) of the data objects) from a content source.

At 380, the discovery operation exports discovered data objects in response to receiving the discovery query. In one embodiment, this involves transmitting information identifying the data objects that were associated with the discovery operation as a result of satisfying one or more of the discovery criteria. Responding to the query can also involve transmitting the data objects themselves. Transmitting the data objects involves reading data from the content source(s) and/or preserved data from the discovery data stored on the content server.

Figure 4:
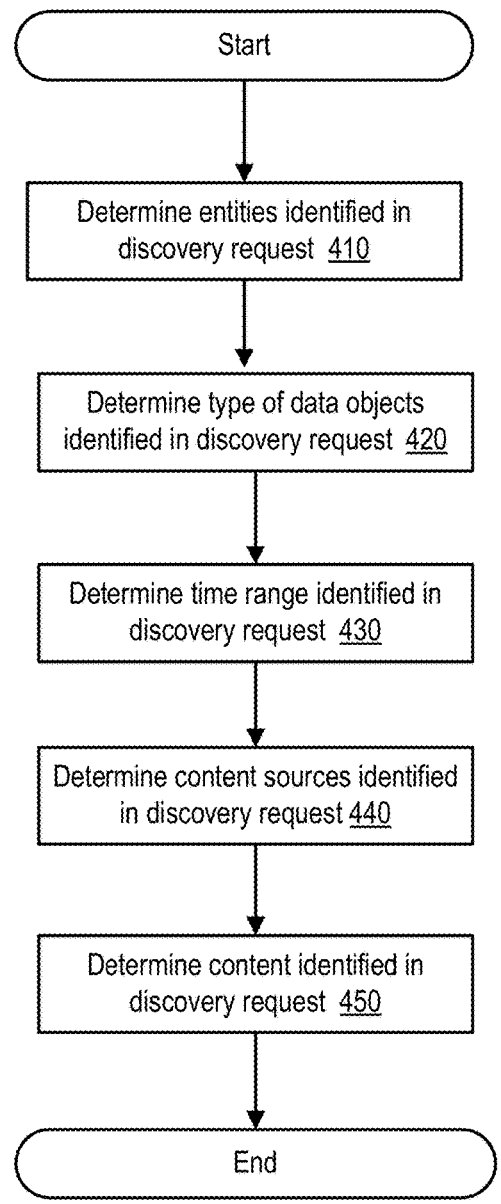
FIG. 4 is a flowchart of a method showing additional details of a method of configuring a discovery operation, according to one embodiment.

FIG. 4 is a flowchart of a method showing additional details of detecting discovery criteria. The method can be performed, for example, by a discovery module, such as discovery module 123 of FIG. 1. At 410, the discovery module determines whether the discovery request includes information that identifies one or more entities, such as one or more user names or department identifiers. For example, the discovery request can specify that content addressed to, received from, accessed by, owned by, and/or that refers to a particular user should be discovered. The discovery request can include information that identifies a user and/or the user's relationship to one or more data objects. If the discovery request specifies a user, and/or information related to the user's relationship to data objects, the discovery module updates configuration information for the discovery operation to indicate that the discovery request will pertain to content associated with the one or more users.

At 420, the discovery module determines whether the discovery request includes information that identifies one or more types of data object to be discovered. For example, the discovery request can specify that only emails are to be discovered. The discovery request can specify one or more file types, such as documents, pictures, web pages, and the like. If the discovery request includes information that identifies a type of data object that is to be discovered, the discovery module updates configuration information for the discovery operation to indicate that the discovery module will only identify data objects of the specified type.

At 430, the discovery module determines whether the discovery requests includes information that identifies a point in time or range of times associated with the discovery request. For example, the discovery request can specify that only data objects that were created and/or accessed after, before, or during a specific time or time interval should be discovered. If the discovery request specifies a time or range of times, the discovery module updates configuration information for the discovery operation to indicate that the discovery module will only identify data objects that satisfy the time criteria.

At 440, the discovery module determines whether the discovery request includes information that identifies one or more content sources. The discovery request can specify that only specific content sources, or specific types of content sources, should be searched for discoverable content. For example, the discovery request can specify that only email servers are to be searched. The discovery request can include information that identifies specific known email servers, or can rely upon the discovery module to detect which content sources satisfy the content source criteria. If the discovery request specifies one or more content sources or types of content sources, the discovery module updates configuration information for the discovery operation to indicate that the discovery module will search content sources indicated by the content source criteria.

At 450, the discovery module determines whether the discovery requests includes information that identifies specific content, such as a keyword or phrase. If the discovery request specifies specific content, the discovery module updates configuration information for the discovery operation to indicate that the discovery module will search for data objects that include the specified content.

Figure 5:
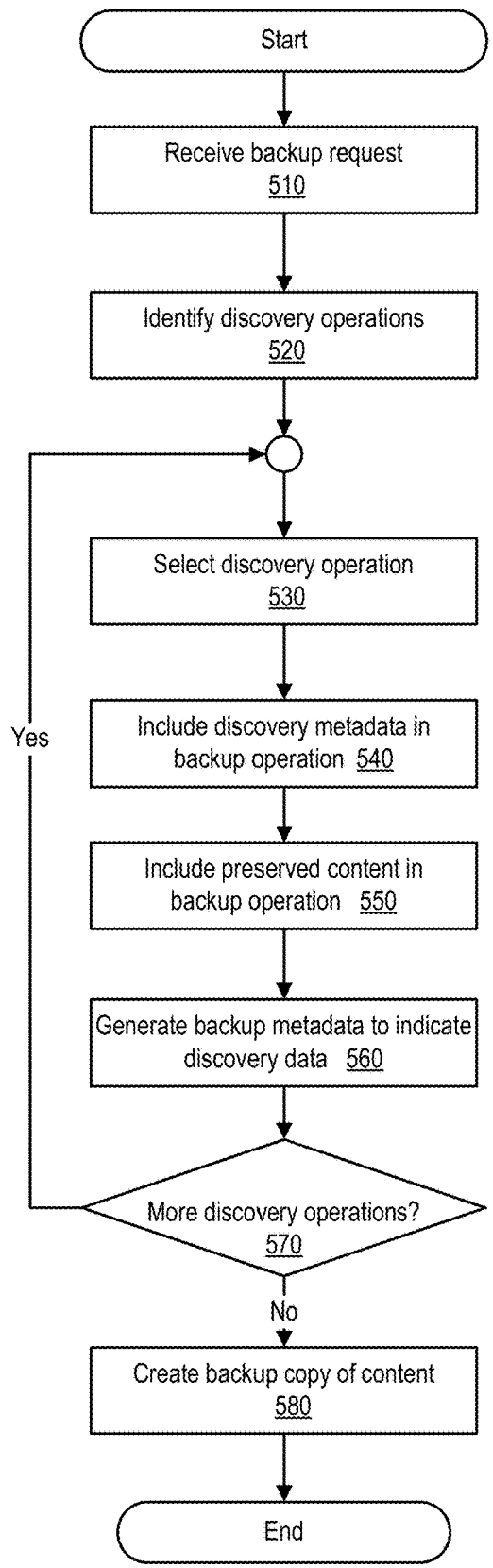
FIG. 5 is a flowchart of a method of performing a backup operation, according to one embodiment.

FIG. 5 is a flowchart showing additional details of a method performing a backup operation. The method can be performed, for example, by a backup module, such as backup module 142 of FIG. 1. Subsequent to performing the backup operation, a discovery operation performed using a content management system, such as the system shown in FIG. 1, can be completed using information captured during the backup operation.

At 510, the backup module receives a backup request. In one embodiment, the backup request specifies a portion or all content managed by a content management module, such as content management module 121 of FIG. 1. The backup request indicates that the specified content should be copied to a backup storage location, such as backup data 161 stored in backup storage 160 of FIG. 1. The backup request can be automatically generated, e.g., in response to detecting the occurrence of some event, such as expiration of a specified time period. Alternatively, the backup request can be manually generated, e.g., by a user, such as a backup administrator.

At 520, the backup module identifies one or more discovery operations that have been initiated and/or completed on the content management system. In one embodiment, the backup request includes information identifying the discovery operations and the backup module uses this information to identify the discovery operations. In one embodiment, the backup module communicates, for example, with a discovery module, such as discovery module 123 of FIG. 1, and requests information identifying which discovery operations have been initiated and/or completed. The discovery operations can be either complete or still in progress, e.g., running concurrently with the backup operation.

The backup module selects, at 530, one of the discovery operations that was initiated by the discovery module. For the selected discovery operation, the backup module includes in the backup operation, at 540, metadata associated with the discovery operation. The metadata includes information identifying the discovery operation and information identifying data objects associated with the discovery operation. The metadata can also include location in the content management system of the data objects, such as one or more content sources, as well as an indication of whether there is preserved content associated with the data object. The backed up metadata associated with a discovery operation can be used to recreate the discovery operation. In one embodiment, the backup module backs up the metadata to backup storage, e.g., discovery data 168 of FIG. 1. Backing up the metadata can include copying the metadata, deduplicating, compressing, and/or encrypting the metadata, as well as transmitting the metadata to the backup storage. In one embodiment, the backup module creates a copy of the metadata in a staging area or indicates that the metadata is to be backed up, and actually backs up the metadata at a later point, e.g., during creation of a backup image.

At 550, the backup module includes in the backup operation preserved data, if any, associated with the selected object. In one embodiment, the backup module backs up the preserved data to backup storage, e.g., discovery data 168 of FIG. 1. Backing up the preserved data can include copying the preserved data, deduplicating, compressing, and/or encrypting the preserved data, as well as transmitting the preserved data to the backup storage. In one embodiment, the backup module creates a copy of the preserved data in a staging area or indicates that the preserved data is to be backed up, and actually backs up the preserved data at a later point, e.g., during creation of a backup image.

The backup module generates, at 560, backup metadata to indicate that the backup operation that is being performed includes content related to the discovery operation. In one embodiment, the backup metadata includes a backup catalog that indicates which discovery operations are included in the backup, and where (e.g., in a given backup image) the data objects preserved in the discovery operation can be located. Using the backup metadata, a user can locate the data objects in the backup image associated with a discovery operation. In one embodiment, the backup module stores the generated backup metadata on backup storage as a separate item. Alternatively, the backup module can delay writing the backup metadata (e.g., store the backup metadata in a staging area) and write the backup metadata as a part of the backup image when the backup image is created.

At 570, the backup module detects whether additional discovery operations have been performed by the discovery module. In one embodiment, this involves accessing the discovery metadata and/or the backup request. If so, the process returns to 530, and the backup module selects another discovery operation. Otherwise, at 580, the backup module creates a backup image of the content specified by the backup request. In one embodiment, creating the backup image involves performing a block-by-block copy operation of the data indicated by the backup request. This involves reading the data from the content sources and/or content server and copying the data to backup storage.

Figure 6:
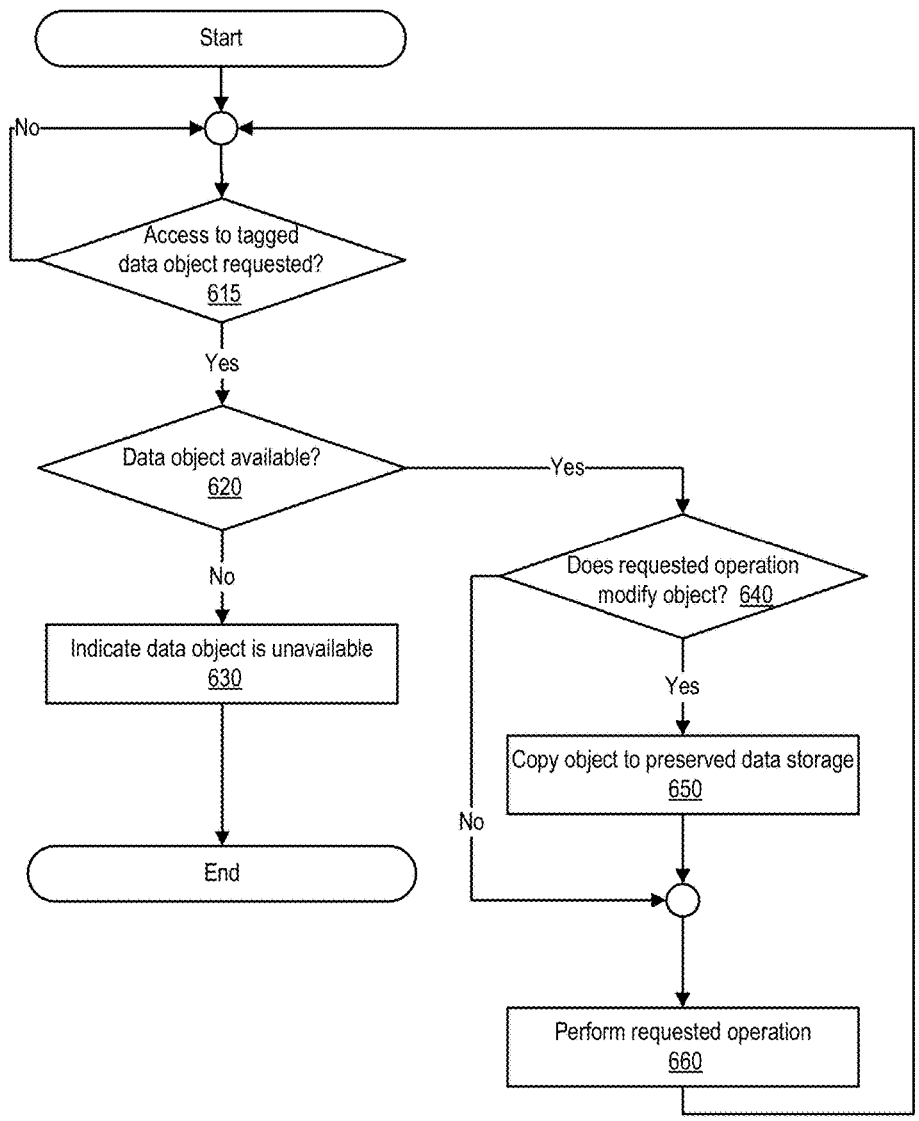
FIG. 6 is a flowchart showing additional details of a method of detecting that discovery-related content is not available, according to one embodiment.

FIG. 6 is flowchart of a method showing additional details of detecting that a data object is unavailable. The method can be performed, for example, by a discovery module, such as discovery module 123 of FIG. 1. A content management module, such as content management module 121 of FIG. 1, is configured to receive and process an access request to a data object managed by the content management module. For example, users can request access to read, write, copy, or delete one or more of the data objects.

The discovery module detects, at 615, whether such a request is directed to a tagged data object, such as a data object associated with a discovery operation. This involves comparing an identifier from the access request with discovery metadata. A user, such as the user that initiated the access request, may be unaware that the data object is associated with a discovery operation. In one embodiment, the request triggers a notification that access is prohibited due to the object being associated with a discovery operation. In one embodiment, the access request includes a request to export the results of a discovery operation. The access request can be automatically generated, such as a periodic status check or audit.

In response to the discovery module detecting that the data object for which access is requested is included in a discovery operation, the content management module detects, at 620, whether the data object is available. In one embodiment, this involves the content management module polling the content source that stores the data object to see if connectivity exists between the content management module and the content source. In one embodiment, the content management module automatically detects that the data object is unavailable, e.g., in response to an outage notification.

If the data object is unavailable, the content management module indicates that the data object is unavailable at 630. In one embodiment, this triggers a restore operation, as discussed in connection with FIG. 7. If the data object is available, the content management module detects, at 640, whether the access request modifies a portion (or all) of the data object. If so, the discovery module copies, at 650, the modified portion (or the entirety) of the data object to a preservation storage location, such as preserved content 156 of FIG. 1. At 660, the access is allowed to proceed to the original data object.

Figure 7:
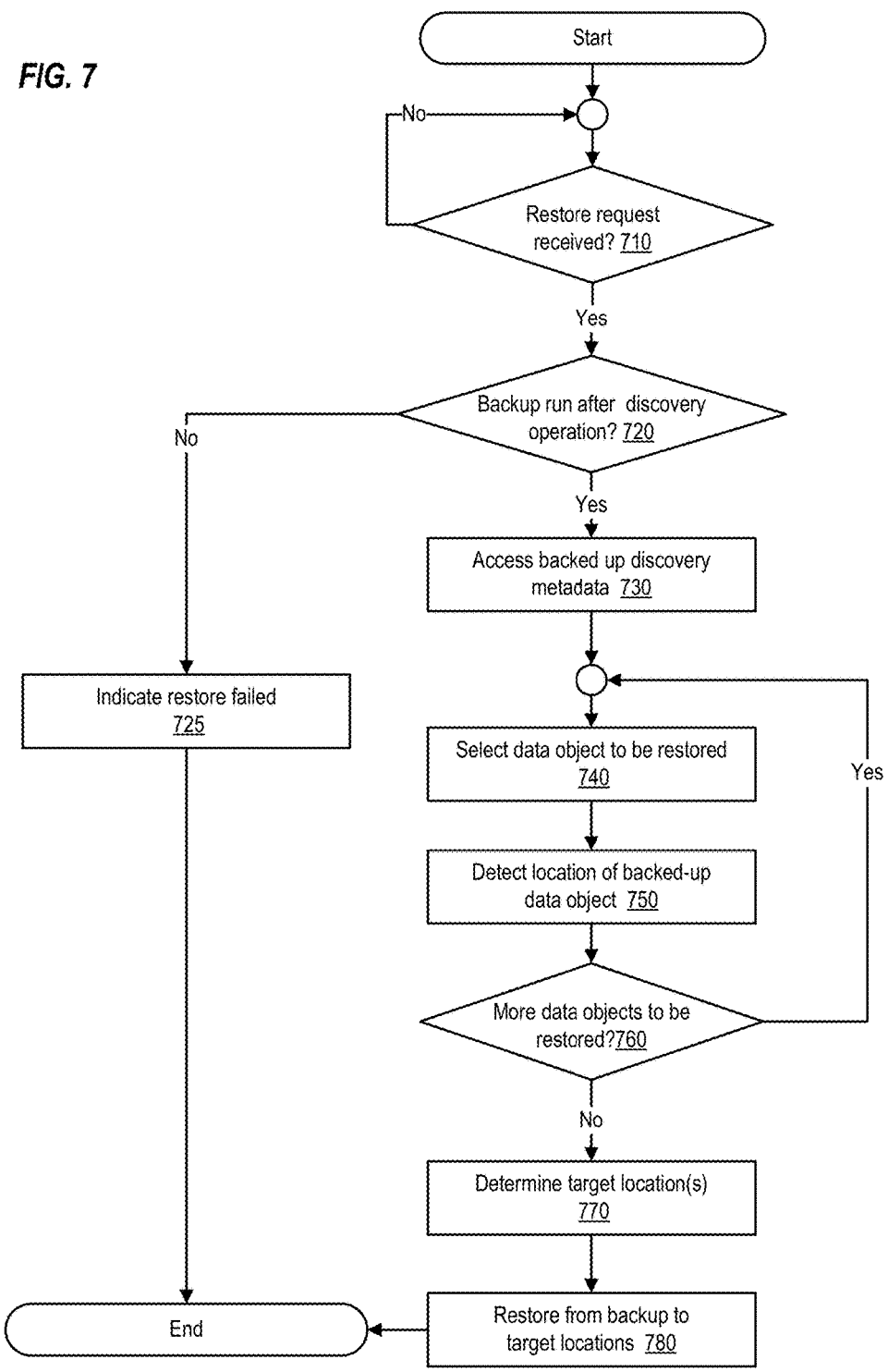
FIG. 7 is a flowchart of a method showing additional details of a method of restoring data from a backup data set to perform a discovery operation, according to one embodiment.

FIG. 7 is a flowchart of a method showing additional details of executing a restore operation. The restore operation essentially recreates the results of a discovery operation run using a content management system, such as shown in FIG. 1. In one embodiment, the results of the discovery operation have become unavailable to a content management module, such as content management module 121 of FIG. 1. The method can be performed, for example, by a restore module, such as restore module 144 of FIG. 1.

At 710, the restore module waits until a restore request is received. In one embodiment, a restore request is received in response to detecting that one or more data objects associated with a discovery operation have become unavailable. Rather than waiting for the data objects to become available again and/or repeating the discovery operation, the discovery operation can be recreated using backup data. In one embodiment, the restore request includes information that identifies one or more discovery operations.

After the restore request is received, the restore module detects, at 720, whether a backup operation was executed after initiation of the discovered content. If no backup was executed after the initiation of the discovery operation, the restore module indicates, at 725 that the requested content cannot be restored. On the other hand, if a backup operation was executed after initiation of the discovery operation, the restore module is configured to locate the backed-up content associated with the discovery operation and restore that content. At 730, the restore module accesses metadata associated with the discovery operation, such as is in discovery metadata 166 of FIG. 1, to identify one or more data objects associated with the specified discovery operation. In one embodiment, the restore module searches metadata associated with one or more backup images, such as a backup catalog stored in data 152 of FIG. 1, to detect where the discovery metadata is located. In one embodiment, the discovery metadata is included in a backup image that was created in a backup operation and that includes other backed up data, such as content and backup metadata. The discovery metadata can also be stored separate from a backup image, e.g., in its own file or other logical grouping of data.

At 740, the restore module selects a data object that is indicated by the discovery metadata as being associated with the discovery operation. The restore module, at 750, determines the location of the data object. The data object can be stored, for example, in the backup image stored in backup storage 160 of FIG. 1. In one embodiment, a portion, or the entirety, of the data object is stored in discovery data, such as discovery data 168 of FIG. 1. The discovery data is configured to store, for example, a version of the data object that existed at the time the discovery operation was executed. The discovery data can also include partial data objects, such as in the case when a portion of a data object was targeted for modification and the unmodified portion is preserved. In one embodiment, the backup image stores one or more versions of the data object, such as versions of the data objects that were modified subsequent to the discovery operation being executed. Detecting whether the discovery data stores the data object involves, for example, accessing discovery metadata, and/or performing a search of the discovery data. In one embodiment, the restore module generates one or more addresses for the selected data object. For example, the restore module can generate a first address within the backup image where the data object is located and a second address in the discovery data where a portion of the data object is stored. Restoring the data object involves restoring data from both addresses. Alternatively, the restore module can detect that the entire data object is located in the discovery data, or in the backup image and only generate a single address where the discovery object is stored. In one embodiment, the discovery data is located in a specific area of the backup image, for example, in a specific range of addresses. In another embodiment, the discovery data is stored separately from the backup image, e.g., in its own file or other logical grouping of data.

At 760, the restore module detects whether more data objects are identified in the discovery metadata as being associated with the discovery operation. If not, the restore module detects target locations to which the data objects will be restored, at 770. In one embodiment, the restore request specifies locations to which the data objects will be copied. The restore module is configured to restore the data objects to their original content sources and/or to a content server, such as content management server 120 of FIG. 1. At 780, the restore module restores the data objects from the backup to the target locations. In one embodiment, restoring the data objects can involve encrypting, decrypting, compressing, uncompressing, rehydrating data, and the like.

Figure 8:
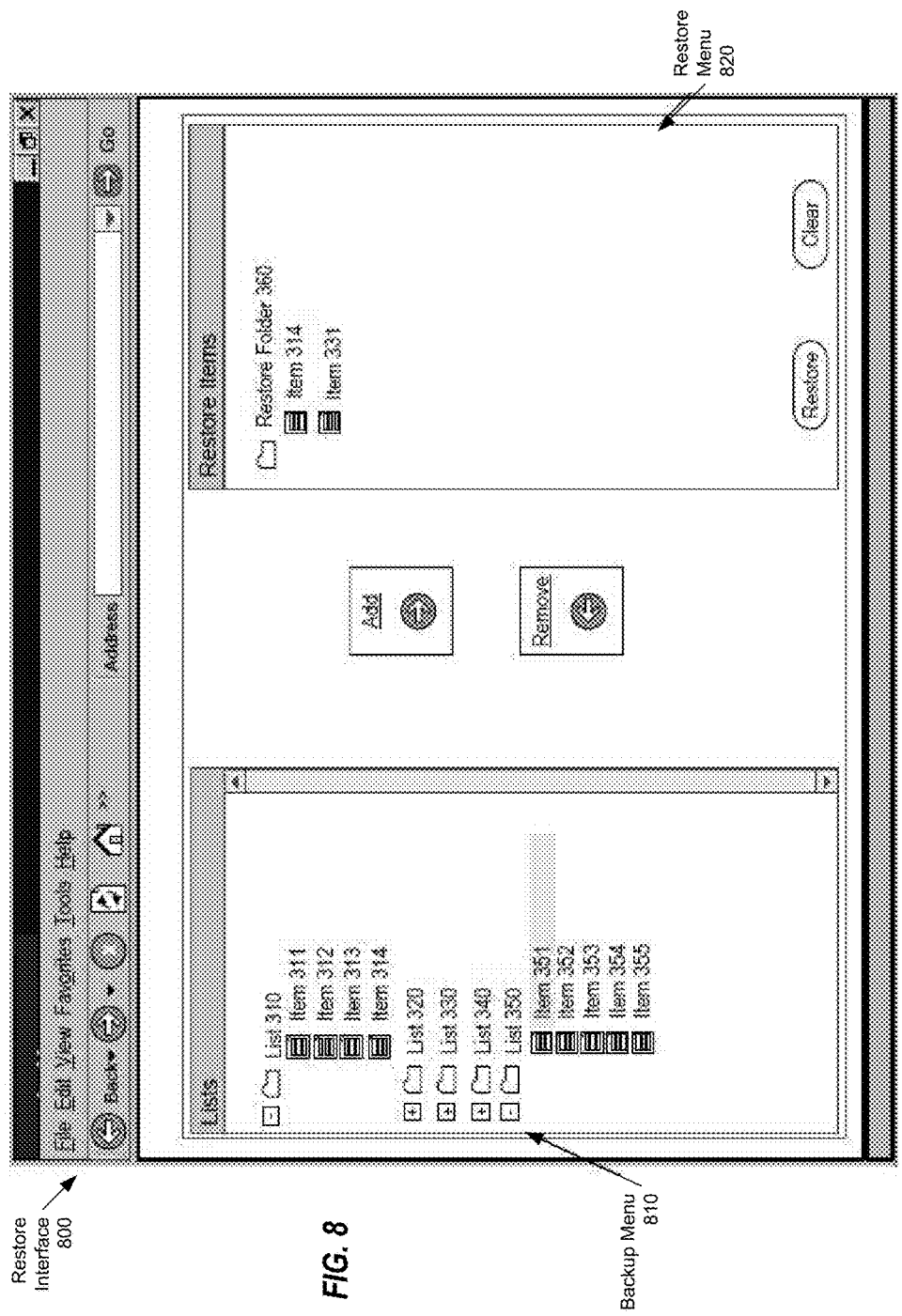
FIG. 8 is an example of a user interface configured to be used to complete a discovery operation, according to one embodiment.

FIG. 8 shows an example user interface configured to be used to complete a discovery operation using backup data. Restore interface 800 includes a backup menu 810 and a restore menu 820. As shown, backup menu 810 includes a plurality of list entries 310-350. In one embodiment, each list entry represents a backed up discovery operation. As can be seen, the list entries can be selected in their entirety, or expanded such that individual items are displayed. The backup menu can be generated by accessing backup metadata to identify which objects were backed up in a given backup operation. In one embodiment, a user selects one or more items from backup menu 810. The list entries and/or selected items are added to restore menu 820. A restore module, such as restore module 144 of FIG. 1, is configured to restore the items that are added to restore menus 820 in response to a user executing a restore command, for example by activating (e.g., clicking) a restore control button. Once the restore operation is executed, the restore module locates the selected items in backup storage and restores the items, as discussed above.

Figure 9:
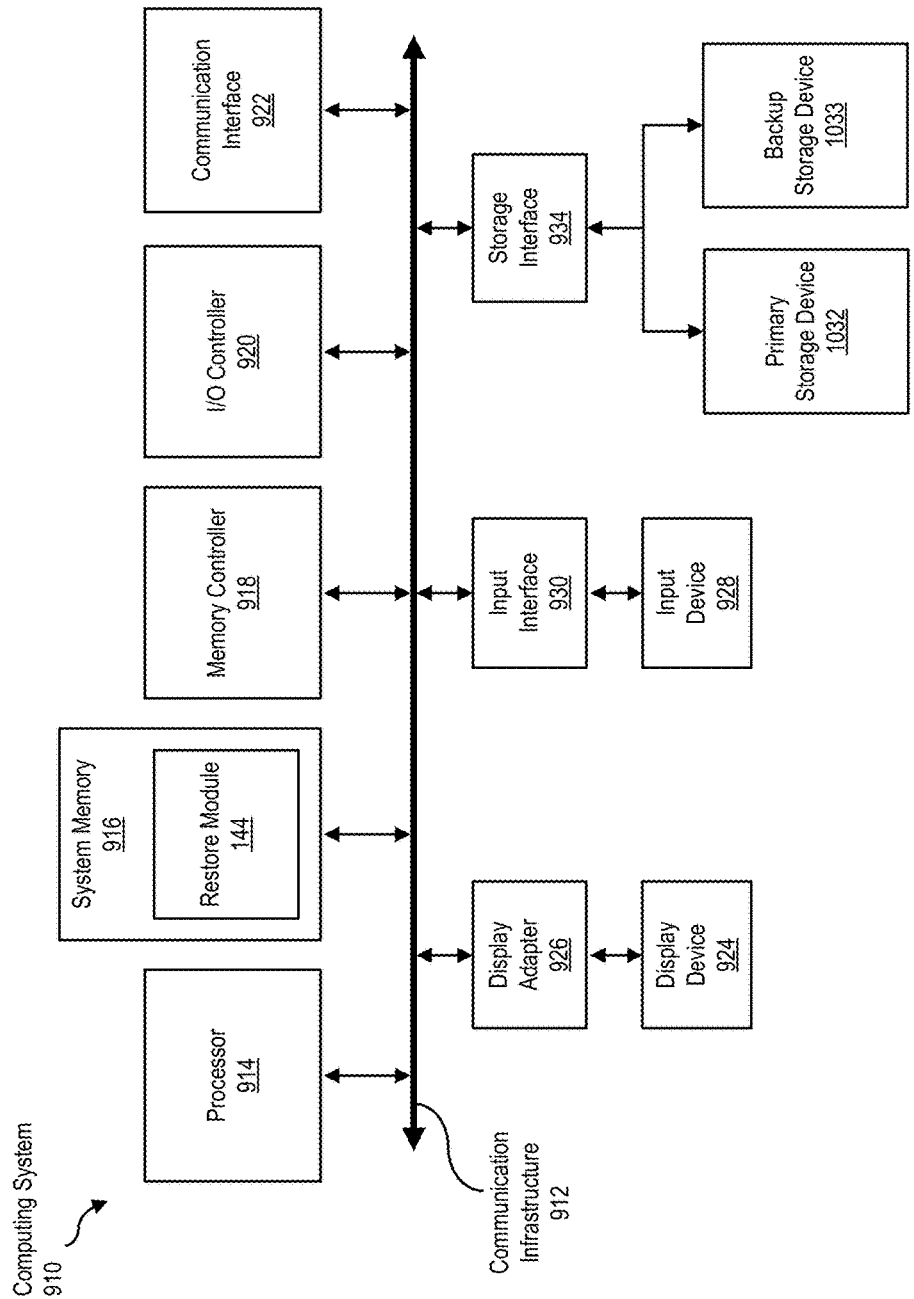
FIG. 9 is a block diagram of a computing device, illustrating how a restore module can be implemented in software, according to one embodiment.

FIG. 9 is a block diagram of a computing device, illustrating how a restore module can be implemented in software, as described above. Computing system 910 broadly represents any single or multi-processor computing device or system capable of executing computer-readable instructions. Examples of computing system 910 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 910 may include at least one processor 914 and a system memory 916. By executing the software that implements a restore module 144, computing system 910 becomes a special purpose computing device that is configured to complete discovery operations using backup data, in the manner described above.

Processor 914 generally represents any type or form of processing unit capable of processing data or interpreting and executing instructions. In certain embodiments, processor 914 may receive instructions from a software application or module. These instructions may cause processor 914 to perform the functions of one or more of the embodiments described and/or illustrated herein. For example, processor 914 may perform and/or be a means for performing the operations described herein. Processor 914 may also perform and/or be a means for performing any other operations, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, program instructions executable to implement a restore module (e.g., as shown in FIG. 1) may be loaded into system memory 916.

In certain embodiments, computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the operations or features described and/or illustrated herein.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 9100, and storage interface 9104.

Communication interface 922 broadly represents any type or form of communication device or adapter capable of facilitating communication between computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer) for display on display device 924.

As illustrated in FIG. 9, computing system 910 may also include at least one input device 928 coupled to communication infrastructure 912 via an input interface 930. Input device 928 generally represents any type or form of input device capable of providing input, either computer or human generated, to computing system 910. Examples of input device 928 include, without limitation, a keyboard, a pointing device, a speech recognition device, or any other input device.

As illustrated in FIG. 9, computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910. A storage device like primary storage device 932 can store information such as full backup images, incremental backup images, and/or backup metadata.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9.

Computing system 910 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 910 for storage in memory via a network such as the Internet or upon a carrier medium.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the embodiments described and/or illustrated herein. Additionally or alternatively, one or more of the embodiments described and/or illustrated herein may be implemented in firmware and/or hardware. For example, computing system 910 may be configured as an application specific integrated circuit (ASIC) adapted to implement one or more of the embodiments disclosed herein.

Figure 10:
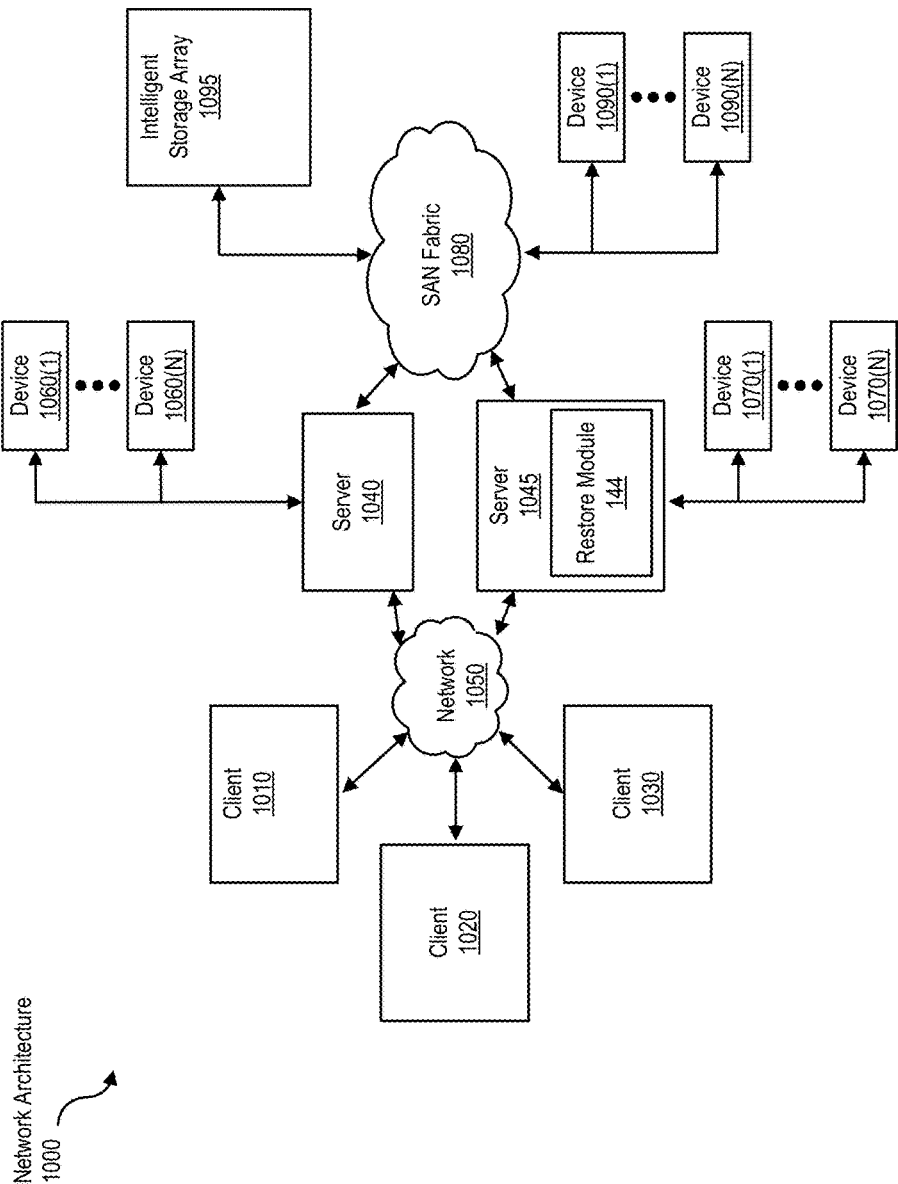
FIG. 10 is a block diagram of a networked system, illustrating how various computing devices can communicate via a network, according to one embodiment.

FIG. 10 is a block diagram of a network architecture 1000 in which client systems 1010, 1020, and 1030 and servers 1040 and 1045 may be coupled to a network 1050. Client systems 1010, 1020, and 1030 generally represent any type or form of computing device or system, such as computing system 910 in FIG. 9.

Similarly, servers 1040 and 1045 generally represent computing devices or systems, such as application servers or database servers, configured to provide various database services and/or run certain software applications. Network 1050 generally represents any telecommunication or computer network including, for example, an intranet, a wide area network (WAN), a local area network (LAN), a personal area network (PAN), or the Internet. In one example, one or more of client systems 1010, 1020, and/or 1030 may include a restore module 144 as shown in FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as Network File System (NFS), Server Message Block (SMB), or Common Internet File System (CIFS). Such storage devices can store backup information and storage configuration information, as described above.

Servers 1040 and 1045 may also be connected to a storage area network (SAN) fabric 1080. SAN fabric 1080 generally represents any type or form of computer network or architecture capable of facilitating communication between multiple storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 1040, server 1045, storage devices 1040(1)-(N), storage devices 1070(1)-(N), storage devices 1090(1)-(N), intelligent storage array 1095, or any combination thereof. All or a portion of one or more of the embodiments disclosed herein may also be encoded as a computer program, stored in server 1040, run by server 1045, and distributed to client systems 1010, 1020, and 1030 over network 1050.

In some examples, all or a portion of one of the systems in FIGS. 1, 9, and 10 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a restore module may transform the behavior of a content management system such that discovery operations can be completed using backup data.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a request to identify a set of potentially-responsive records, wherein
the request is based, at least in part, on a discovery request compelling production of records related to a litigation, wherein
the discovery request is received as part of the litigation, and
the discovery request requires the records to be produced without any changes to content of the records or to metadata associated with the records,
the request comprises search criteria comprising a user, a time range constraint, a content source constraint, and a content-based search term,
the records comprise a plurality of data objects stored in a backup of content managed by a content management system,
the backup comprises a plurality of backups corresponding to a plurality of versions of a first data object of the plurality of data objects, and
the content management system is configured to prevent the user from accessing the records;
identifying the set of potentially-responsive records, wherein
the identifying comprises searching a plurality of tags associated with the plurality of data objects to identify one or more data objects that are associated with the user and that satisfy the time range constraint and the content source constraint, and
the set of potentially-responsive records comprises records associated with the one or more data objects that satisfy the time range constraint and the content source constraint, including at least the first data object;
detecting that the first data object is unavailable in the content management system; and
in response to detecting that the first data object is unavailable in the content management system, performing a restore operation, wherein
the restore operation comprises identifying a first version of the plurality of versions of the first data object,
the first version of the first data object corresponds to the first data object as the first data object existed at a time at which the request was received, and
the restore operation is configured to make the first data object available in the set of potentially-responsive records; and
subsequent to receiving the discovery request and identifying the set of potentially-responsive records, producing the set of potentially-responsive records in order to satisfy the discovery request from the litigation, wherein
the producing comprises exporting the set of potentially-responsive records from the content management system.

2. The method of claim 1, further comprising:
generating the backup, wherein
the generating is performed by a backup application, and
the generating comprises copying at least one data object of the plurality of data objects from one or more content sources managed by the content management system,
the generating further comprises including discovery metadata and preserved data in the backup, and
the generating further comprises generating backup metadata, wherein
the backup metadata identifies one or more discovery operations that are included in the backup and a location of the first data object in the backup.

3. The method of claim 1, further comprising:
searching the set of potentially-responsive records to identify one or more responsive records, wherein
the searching the set of potentially-responsive records comprises searching protected storage content associated with the records, wherein
the protected storage content comprises full text of associated storage objects, and
the searching is based on the content-based search term; and
restoring the responsive records from the backup, wherein
the restoring is performed in response to identifying the responsive records, and
the restoring comprises copying the data objects associated with the responsive records from the backup to at least one destination computing device.

4. The method of claim 3, wherein
the restoring comprises copying at least one data object from the backup to locations on one or more content sources.

5. The method of claim 1, wherein
the backup was created by a backup operation performed subsequent to receiving the request.

6. The method of claim 1, further comprising:
placing a hold on at least tagged one data object.

7. The method of claim 1, wherein
the content management system comprises a MICROSOFT SHAREPOINT application.

8. The method of claim 1, wherein
the content management system is further configured to prevent the user from accessing at least a first data object by creating a copy of the first data object and storing the copy in a preservation storage location, wherein
the first data object is one of the plurality of data objects.

9. A non-transitory computer readable storage medium storing program instructions executable to:
receive a request to identify a set of potentially-responsive records, wherein
the request is based, at least in part, on a discovery request compelling production of records related to a litigation, wherein
the discovery request is received as part of the litigation, and
the discovery request requires the records to be produced without any changes to content of the records or to metadata associated with the records,
the request comprises search criteria comprising a user, a time range constraint, a content source constraint, and a content-based search term,
the records comprise a plurality of data objects that were stored in a backup of content managed by a content management system in response to a backup operation being executed,
the backup comprises a plurality of backups corresponding to a plurality of versions of a first data object of the plurality of data objects, and
the content management system is configured to prevent the user from accessing the records;
identify the set of potentially-responsive records, wherein
identifying the set of potentially-responsive records comprises searching a plurality of tags associated with the plurality of data objects to identify one or more data objects that are associated with the user and that satisfy the time range constraint and the content source constraint, and
the set of potentially-responsive records comprises records associated with the one or more data objects that satisfy the time range constraint and the content source constraint, including at least the first data object;
detect that the first data object is unavailable in the content management system; and
in response to detecting that the first data object is unavailable in the content management system, perform a restore operation, wherein
the restore operation comprises identifying a first version of the plurality of versions of the first data object,
the first version of the first data object corresponds to the first data object as the first data object existed at a time at which the request was received, and
the restore operation is configured to make the first data object available in the set of potentially-responsive records; and
subsequent to receiving the discovery request and identifying the set of potentially-responsive records, produce the set of potentially-responsive records in order to satisfy the discovery request from the litigation, wherein
producing the set of potentially-responsive records comprises exporting the set of potentially-responsive records from the content management system.

10. The non-transitory computer readable storage medium of claim 9, wherein the instructions are further executable to:
generate the backup, wherein
generating the backup is performed by a backup application, and
the generating comprises copying at least one data object of the plurality of data objects from one or more content sources managed by the content management system,
the generating further comprises including discovery metadata and preserved data in the backup, and
the generating further comprises generating backup metadata, wherein
the backup metadata identifies one or more discovery operations that are included in the backup and a location of the first data object in the backup.

11. The non-transitory computer readable storage medium of claim 9, wherein the instructions are further executable to:
search the set of potentially-responsive records to identify one or more responsive records, wherein
the searching the set of potentially-responsive records comprises searching protected storage content associated with the records, wherein
the protected storage content comprises full text of associated storage objects, and
the searching is based on the content-based search term; and
restore the responsive records from the backup, wherein
restoring the responsive records from the backup is performed in response to identifying the responsive records, and
restoring the responsive records from the backup comprises copying the data objects associated with the responsive records from the backup to at least one destination computing device.

12. The non-transitory computer readable storage medium of claim 11, wherein
the restoring comprises copying at least one data object from the backup to locations on one or more content sources.

13. The non-transitory computer readable storage medium of claim 9, further comprising
in response to detecting that the first data object is unavailable in the content management system, indicate that the first data object is unavailable.

14. The non-transitory computer readable storage medium of claim 9, further comprising
placing a hold on at least one tagged data object.

15. A system comprising:
one or more processors; and
a memory coupled to the one or more processors, wherein
the memory stores program instructions executable by the one or more processors to:
receive a request to identify a set of potentially-responsive records, wherein
the request is based, at least in part, on a discovery request compelling production of records related to a litigation, wherein
the discovery request is received as part of the litigation, and
the discovery request requires the records to be produced without any changes to content of the records or to metadata associated with the records, the request comprises search criteria comprising a user, a time range constraint, a content source constraint, and a content-based search term, the records comprise a plurality of data objects that were stored in a backup of content managed by a content management system in response to a backup operation being executed, the backup comprises a plurality of backups corresponding to a plurality of versions of a first data object of the plurality of data objects, and the content management system is configured to prevent the user from accessing the records;

identify the set of potentially-responsive records, wherein identifying the set of potentially-responsive records comprises searching a plurality of tags associated with the plurality of data objects to identify one or more data objects that are associated with the user and that satisfy the time range constraint and the content source constraint, and the set of potentially-responsive records comprises records associated with the one or more data objects that satisfy the time range constraint and the content source constraint, including at least the first data object;

detect that the first data object is unavailable in the content management system; and in response to detecting that the first data object is unavailable in the content management system, perform a restore operation, wherein the restore operation comprises identifying a first version of the plurality of versions of the first data object, the first version of the first data object corresponds to the first data object as the first data object existed at a time at which the request was received, and the restore operation is configured to make the first data object available in the set of potentially-responsive records; and subsequent to receiving the discovery request and identifying the set of potentially-responsive records, produce the set of potentially-responsive records in order to satisfy the discovery request from the litigation, wherein producing the set of potentially-responsive records comprises exporting the set of potentially-responsive records from the content management system.

16. The system of claim 15, wherein the instructions are further executable to:

generate the backup, wherein generating the backup is performed by a backup application, and the generating comprises copying at least one data object of the plurality of data objects from one or more content sources managed by the content management system, the generating further comprises including discovery metadata and preserved data in the backup, and the generating further comprises generating backup metadata, wherein the backup metadata identifies one or more discovery operations that are included in the backup and a location of the first data object in the backup.

17. The system of claim 15, wherein the instructions are further executable to:

search the set of potentially-responsive records to identify one or more responsive records, wherein the searching the set of potentially-responsive records comprises searching protected storage content associated with the records, wherein the protected storage content comprises full text of associated storage objects, and the searching is based on the content-based search term; and restore the responsive records from the backup, wherein restoring the responsive records from the backup is performed in response to identifying the responsive records, and restoring the responsive records from the backup comprises copying the data objects associated with the responsive records from the backup to at least one destination computing device.

18. The system of claim 17, further comprising placing a hold on at least one tagged data object, and the restoring comprises copying at least one data object from the backup to locations on one or more content sources.

19. The system of claim 15, further comprising in response to detecting that the first data object is unavailable in the content management system, indicate that the first data object is unavailable.

* * * * *